United States Patent
Duggi et al.

(10) Patent No.: US 7,848,757 B2
(45) Date of Patent: Dec. 7, 2010

(54) APPARATUS AND METHOD FOR EXTENDING MOBILITY IN A MOBILE AD HOC NETWORK

(75) Inventors: Mohan R. Duggi, Garland, TX (US); Gowri Shankar Ramanarayanan, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 879 days.

(21) Appl. No.: 10/977,043

(22) Filed: Oct. 29, 2004

(65) Prior Publication Data

US 2006/0092939 A1    May 4, 2006

(51) Int. Cl.
*H04W 40/00* (2009.01)
(52) U.S. Cl. .................. 455/445; 455/410; 455/414.1; 455/437; 455/438; 455/439; 370/338; 370/328; 370/401; 370/400; 370/466; 370/349; 709/238; 709/236; 709/242; 709/239; 709/245
(58) Field of Classification Search ............... 370/392, 370/338, 401, 400, 328, 466, 349; 455/445, 455/410, 414.1, 437, 438, 439; 709/238, 709/236, 242, 239, 227, 245
See application file for complete search history.

(56) References Cited

U.S. PATENT DOCUMENTS

| | | | | |
|---|---|---|---|---|
| 6,430,698 | B1 * | 8/2002 | Khalil et al. ............. | 714/4 |
| 6,845,091 | B2 * | 1/2005 | Ogier et al. ............. | 370/338 |
| 6,850,532 | B2 * | 2/2005 | Thubert et al. ........... | 370/401 |
| 6,865,184 | B2 * | 3/2005 | Thubert et al. ........... | 370/401 |
| 7,031,288 | B2 * | 4/2006 | Ogier .................... | 370/338 |
| 7,031,328 | B2 * | 4/2006 | Thubert et al. ........... | 370/401 |
| 7,298,743 | B2 * | 11/2007 | Markki et al. ............ | 370/392 |
| 7,327,683 | B2 * | 2/2008 | Ogier et al. .............. | 370/236 |
| 7,342,916 | B2 * | 3/2008 | Das et al. ............... | 370/351 |
| 2002/0012320 | A1 * | 1/2002 | Ogier et al. ............. | 370/252 |
| 2003/0095504 | A1 * | 5/2003 | Ogier .................... | 370/235 |
| 2003/0095523 | A1 * | 5/2003 | Korus et al. ............. | 370/338 |
| 2004/0004967 | A1 * | 1/2004 | Nakatsugawa et al. ...... | 370/400 |
| 2004/0057440 | A1 | 3/2004 | Thubert et al. | |
| 2004/0105420 | A1 * | 6/2004 | Takeda et al. ............ | 370/349 |
| 2004/0148428 | A1 * | 7/2004 | Tsirtsis ................. | 709/238 |
| 2004/0157557 | A1 * | 8/2004 | Barnett et al. ............ | 455/41.2 |
| 2004/0203797 | A1 * | 10/2004 | Burr ..................... | 455/445 |

(Continued)

FOREIGN PATENT DOCUMENTS

CN    1505429 A    6/2004

(Continued)

OTHER PUBLICATIONS

European Search Report dated Nov. 18, 2009 in connection with European Patent Application No. 05 02 3294.

(Continued)

*Primary Examiner*—Matthew D Anderson
*Assistant Examiner*—April G Gonzales

(57) ABSTRACT

Mobility in a mobile ad hoc network (MANET) can be extended by using fixed network resources to support MANET-level communication between a traveling MANET node and the remainder of the MANET. The IPv6 protocol is used over the fixed network resources to support the MANET-level communication, and mobility-supporting features of the IPv6 protocol are exploited without modifying the IPv6 protocol.

20 Claims, 8 Drawing Sheets

U.S. PATENT DOCUMENTS

| | | | |
|---|---|---|---|
| 2004/0218573 A1* | 11/2004 | Takahashi et al. | 370/338 |
| 2005/0117560 A1* | 6/2005 | Thubert et al. | 370/349 |
| 2005/0128975 A1* | 6/2005 | Kobayashi et al. | 370/328 |
| 2005/0152298 A1* | 7/2005 | Thubert et al. | 370/312 |
| 2005/0157749 A1* | 7/2005 | Lee et al. | 370/466 |
| 2006/0029014 A1* | 2/2006 | Maturi | 370/328 |

FOREIGN PATENT DOCUMENTS

| | | | |
|---|---|---|---|
| EP | 1 111 874 A1 | 6/2001 | |

OTHER PUBLICATIONS

T. Narten, et al., "Neighbor Discovery for IP Version 6 (IPv6)", Network Working Group Request for Comments, Dec. 1, 1998, p. 1-49.

Office Action dated Oct. 23, 2009 in connection with Chinese Patent Application No. 200510117045.8.

* cited by examiner

APPARATUS AND METHOD FOR EXTENDING MOBILITY IN A MOBILE AD HOC NETWORK

TECHNICAL FIELD OF THE INVENTION

The present invention relates generally to wireless networks and, more specifically, to a mobile ad hoc network (MANET).

BACKGROUND OF THE INVENTION

Wireless network topologies that enable wireless nodes (i.e., mobile stations, wireless terminals) to communicate with each other and with fixed networks generally fall into two categories: i) infrastructure-based and ii) infrastructure-less. Infrastructure-based networks have traditionally been based on the cellular concept and require a high level of infrastructure support. In an infrastructure-based network, wireless nodes communicate through access points (e.g., base stations) connected to the fixed network (e.g., Internet). Typical infrastructure-based networks include GSM networks, UMTS networks, CDMA networks, WLL networks, WLAN, and the like.

In an infrastructureless network, wireless nodes (i.e., mobile stations, wireless terminals) communicate directly rather than through access points or other base stations. One common and increasingly popular infrastructureless network topology is the mobile ad hoc network (MANET). A MANET is a group of wireless nodes that dynamically form a network with each other and without using any pre-existing fixed network infrastructure. In most cases, wireless nodes of a MANET are small mobile devices that are relatively limited in term of CPU capability, memory size, and power consumption.

Mobile ad hoc networks are expected to continue to grow over the next 2-3 years to become the dominant peer-to-peer communication technology. Cell phones are being equipped with IEEE-802.11 and other wireless LAN technologies. The proliferation of cell phones and the ubiquity of economical IEEE-802.11 networks will create a new kind of mobile, ad-hoc and peer-to-peer network.

As noted above, a mobile ad hoc network (MANET) can be set up without using a pre-existing network infrastructure. This can be done anywhere and at anytime. The wireless nodes of a MANET are connected by wireless links and are free to move randomly. The wireless nodes also act as routers. A MANET supports traffic types that are different from the traffic types typically found in an infrastructure-based wireless network. MANET traffic types include: 1) peer-to-peer traffic; 2) remote-to-remote traffic; and 3) dynamic traffic.

In peer-to-peer traffic, there is only one hop between the communicating wireless nodes (i.e., direct communication). In this instance, the network traffic (in bits/second) is usually constant. In remote-to-remote traffic, there are two or more hops between communicating wireless nodes, but a stable route is maintained between the source and destination nodes. This often occurs if several nodes stay within range of each other in one area or if the nodes move as a group. Dynamic traffic results when the MANET nodes move around and communication routes must be reconstructed. This often causes poor connectivity and network traffic occurs in short bursts.

Each MANET node is autonomous and may function as both a host and a router. Thus, each wireless node performs basic host processing and performs router switch functions. Thus, endpoints and switches are indistinguishable in a MANET. Since there is no central network to control network operations, control and management of a MANET is distributed among the wireless nodes. The MANET nodes cooperate to implement security and routing functions.

A MANET may implement different types of routing. Basic types of ad hoc routing algorithms are single-hop and multi-hop. These are based on different link layer attributes and routing protocols. A single-hop MANET is simpler than a multi-hop MANET, but lacks the functionality and flexibility of a multi-hip MANET. When delivering data packets from a source to its destination out of the direct wireless transmission range, the packets should be forwarded via one or more intermediate nodes.

Since MANET nodes are mobile, the radio frequency (RF) links may change rapidly and unpredictably over time. In order to compensate for traffic and propagation conditions, the MANET nodes dynamically modify routing information between each other as the nodes move, thereby forming new network topologies.

Advantageously, a MANET node may operate not only within the mobile ad hoc network, but also may access a public fixed network (e.g., cellular network). This ability to access public fixed networks presents the possibility of extended mobility of MANET nodes, because the fixed networks can be used to maintain contact with MANET nodes that have traveled far from the remaining nodes of the MANET.

In the prior art, mobility-supporting features of the IPv6 protocol have been utilized to maintain contact with traveling MANET nodes via public fixed networks. However, these approaches have required at least some modification of the IPv6 protocol, which is not always desirable, and is sometimes not possible.

Therefore, there is a need in the art for improved support of extended mobility in mobile ad hoc networks. In particular, there is a need for improved support of extended mobility that can avoid modification of the IPv6 protocol.

SUMMARY OF THE INVENTION

The present invention introduces an apparatus and related method for supporting extended mobility in mobile ad hoc networks (MANET) by utilizing mobility-supporting features of the IPv6 protocol. Exemplary embodiments can exploit mobility-supporting features of the IPv6 protocol over a fixed network, without requiring any modification of the IPv6 protocol.

Accordingly, to address the above-discussed deficiencies of the prior art, it is a primary object of the present invention to provide an apparatus for extending mobility in a MANET comprising: 1) an IPv6 controller for producing IPv6 proxy Neighbor Advertisements; and 2) a MANET controller coupled to the IPv6 controller for recognizing when the IPv6 controller produces an IPv6 proxy Neighbor Advertisement on behalf of a traveling MANET node. The MANET controller is responsive to the recognizing for (a) performing proxy communication with the MANET on behalf of the traveling MANET node, and (b) transmitting on the MANET information from the IPv6 proxy Neighbor Advertisement.

According to one embodiment of the present invention, the apparatus operates as a gateway apparatus and further comprises a first interface to a wired network and a second interface to a wireless network, the first interface coupled to the IPv6 controller and the second interface coupled to the MANET controller.

According to another embodiment of the present invention, the MANET controller is responsive to the recognizing by both (a) performing proxy communication with the MANET on behalf of the traveling MANET node, and (b) transmitting on the MANET information from the IPv6 proxy Neighbor Advertisement.

According to still another embodiment of the present invention, the information further comprises destination address information which the MANET is to use for proxy communication with the traveling MANET node.

According to a further embodiment of the present invention, the MANET controller is responsive to the recognizing for encapsulating the IPv6 proxy Neighbor Advertisement in a MANET-level packet.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile ad hoc network.

Figure 1:
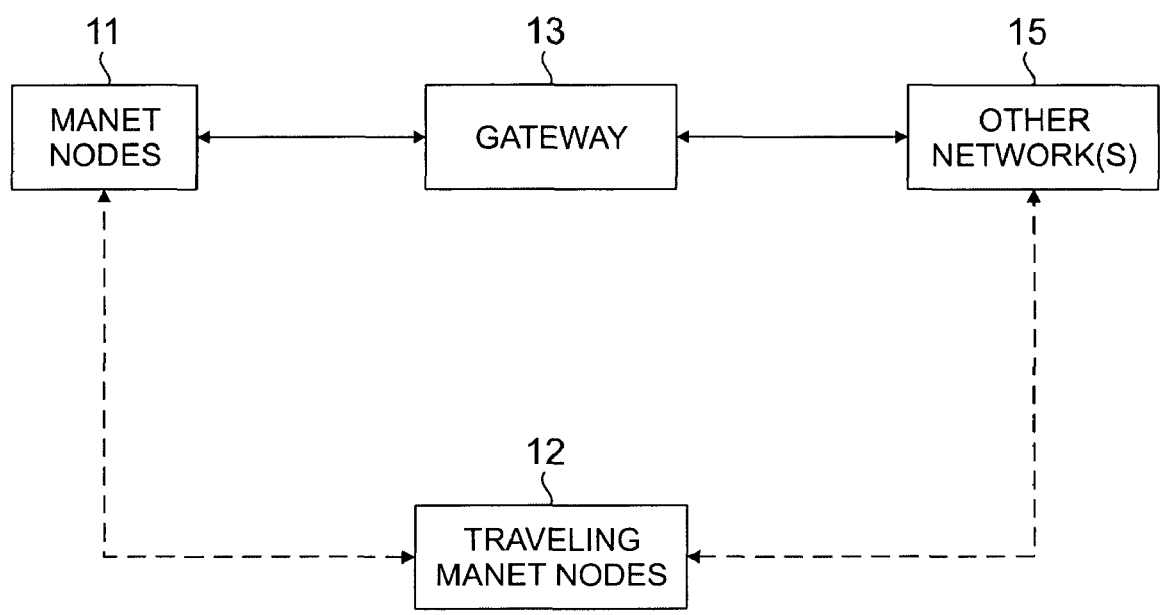
FIG. 1 illustrates an exemplary embodiment of a MANET which supports extended mobility according to exemplary embodiments of the invention.

FIG. 1 illustrates an exemplary embodiment of an extended mobility MANET according to the principles of the present invention. As shown by broken line in FIG. 1, a MANET node 12 operating in a conventional MANET with a plurality of other MANET nodes may travel out of wireless communication range of the remaining MANET nodes (designated generally at 11). However, if the traveling MANET node 12 can access fixed network resources (designated generally at 15) then the traveling MANET node can maintain contact with the remaining MANET nodes 11 via a gateway apparatus 13 which interfaces between the fixed network(s) and the remaining MANET nodes 11. In some exemplary embodiments, the gateway apparatus 13 contains appropriate functionality to operate as a MANET node in a MANET network with the remaining MANET nodes 11. The gateway apparatus 13 further functions as a proxy for the traveling MANET node 12, thereby permitting the remaining MANET nodes 11 to communicate with the traveling MANET node 12 using their conventional MANET communication operations.

Figure 2:
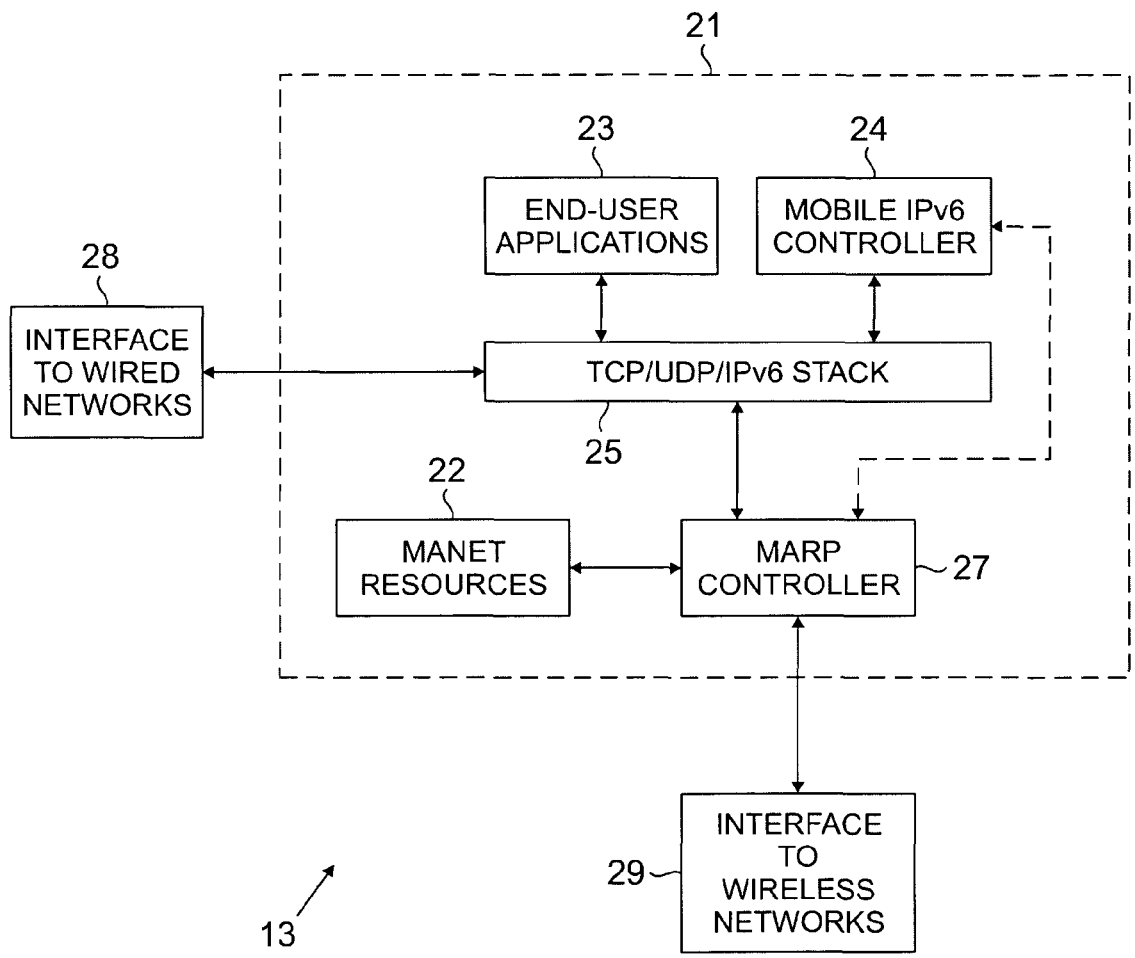
FIG. 2 illustrates an exemplary embodiment of a gateway apparatus according to the principles of the present invention.

FIG. 2 illustrates the gateway 13 of FIG. 1 in greater detail according to an exemplary embodiment of the present invention. In particular, the gateway 13 comprises a home agent 21, interface 28 to wired networks, and interface 29 to wireless networks. Home agent 21 comprises MANET resources 22, end-user applications 23, mobile IPv6 controller 24, TCP/UCP/IPv6 stack 25, and MANET routing protocol (MARP) controller 27. MARP controller 27 is logically connected to the mobile IPv6 controller 24 (as indicated by dotted line) for detecting certain operations of the mobile IPv6 controller 24. Interface 28 enables TCP/UDP/IPv6 stack 25 to communicate with one or more wired communication networks. Interface 29 enables MARP controller 27 to communicate with one or more wireless communication networks.

Figure 3:
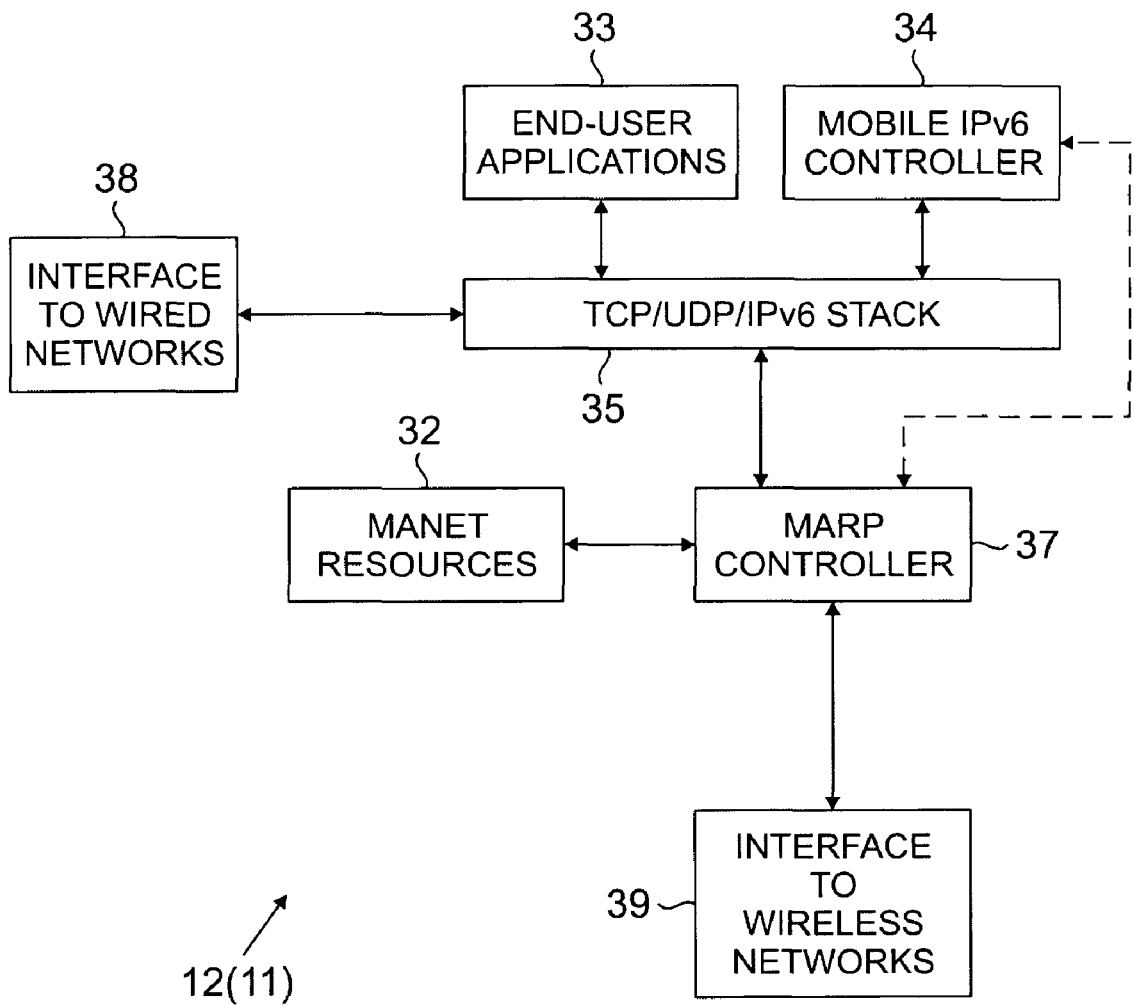
FIG. 3 illustrates an exemplary embodiment of a MANET node according to the principles of the present invention.

FIG. 3 illustrates exemplary embodiments of the traveling MANET node 12 and the remaining MANET nodes 11 of FIG. 1. In particular, the MANET node 12 (or 11) comprises MANET resources 32, end-user applications 33, mobile IPv6 controller 34, TCP/UCP/IPv6 stack 35, MANET routing protocol (MARP) controller 37, interface 38 to wired networks, and interface 39 to wireless networks. MARP controller 37 is logically connected to the mobile IPv6 controller 34 (as indicated by dotted line) for detecting certain operations of the mobile IPv6 controller 34. Interface 38 enables TCP/UDP/IPv6 stack 35 to communicate with one or more wired communication networks. Interface 39 enables MARP controller 37 to communicate with one or more wireless communication networks.

Figure 4:
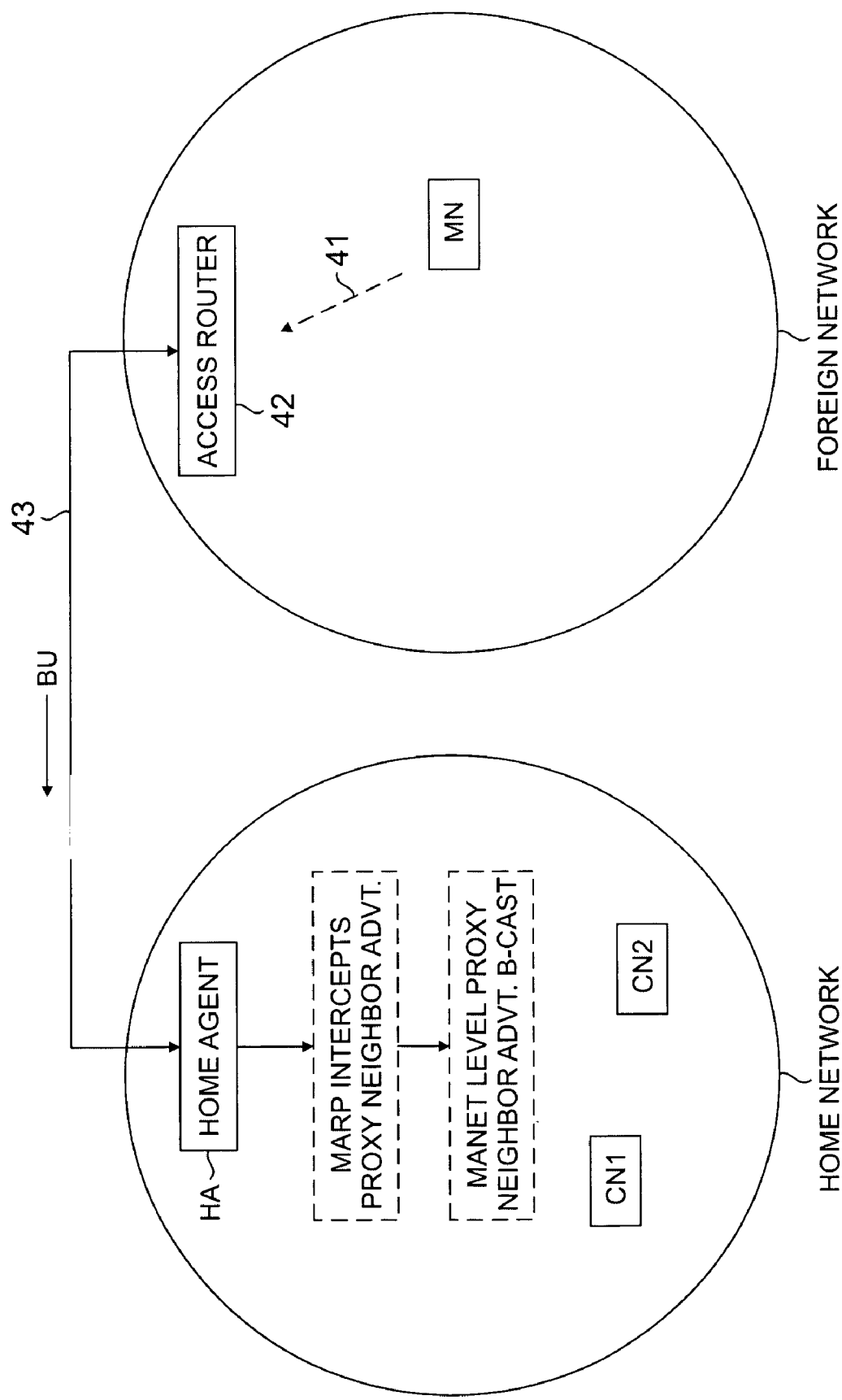
FIG. 4 illustrates the use of IPv6 and fixed network resources to support extended mobility of MANET nodes according to exemplary embodiments of the invention.

FIG. 4 illustrates the use of IPv6 and fixed network resources to support extended mobility of MANET nodes according to exemplary embodiments of the invention. In particular, FIG. 4 illustrates the operational situation when a MANET node such as shown in FIG. 3 travels from a home network, where the remaining MANET nodes are operating in a conventional MANET, to a foreign network which is outside the communication range of the conventional MANET operating in the home network. In the example of FIG. 4, the traveling MANET node in the foreign network is designated as MN, and the remaining MANET nodes operating conventionally in the home network are designated as CN1 and CN2. Also in FIG. 4, the home agent of the gateway (see also FIGS. 1 and 2) is designated as HA. As shown in FIG. 4, after the traveling MANET node has arrived in the foreign network, conventional techniques are used to transmit a binding update (BU) from the MIPv6 controller of the traveling node to the MIPv6 controller of the home agent in the home network. The binding update can traverse, for example, a cellular (or other fixed) network at 41, an access router 42, and a wired data network 43 (e.g., the internet).

The MIPv6 controller within the home agent processes the binding update in conventional fashion, which includes broadcasting an IPv6 proxy Neighbor Advertisement on behalf of the traveling MANET node. As shown in FIG. 4, the MARP controller of the home agent recognizes when the MIPv6 controller of the home agent broadcasts the proxy Neighbor Advertisement. When the MARP controller of the home agent detects the proxy Neighbor Advertisement, the MARP controller adds the IP address of the traveling MANET node to a proxy list maintained in the MARP controller, and the MARP controller also sends a MANET-level broadcast of the proxy Neighbor Advertisement. In some embodiments, the MARP controller achieves the MANET-level broadcast by encapsulating in a special MARP header the IP packet that carries the proxy Neighbor Advertisement. Exemplary operations described above with respect to FIG. 4 are described in more detail in FIG. 5.

Figure 5:
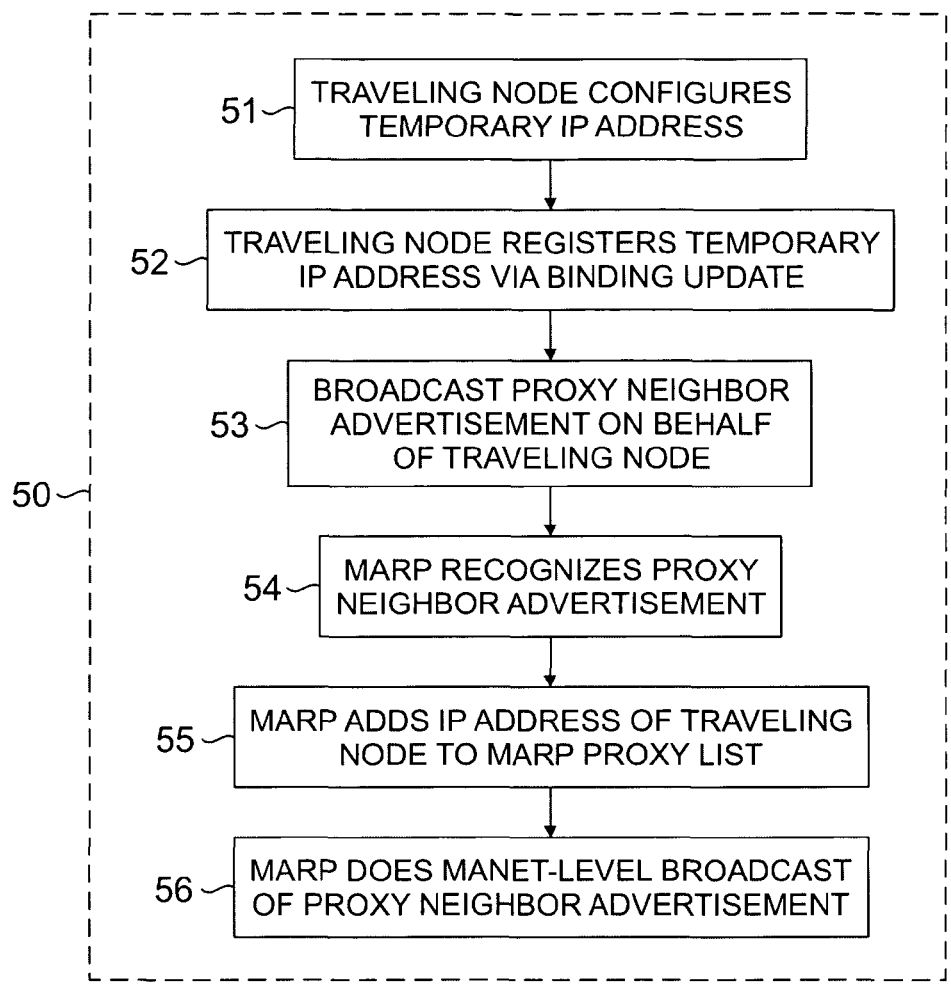
FIG. 5 is a flow diagram illustrating exemplary operations in the networks of FIG. 4 in greater detail.

FIG. 5 depicts flow diagram 50, which illustrates exemplary operations in the FIG. 4 network in greater detail. The operations of FIG. 5 begin after the traveling MANET node discovers (using conventional techniques) that it is no longer in its home network. At step 51, the traveling node configures for itself a temporary IP address using, for example, conventional IPv6 stateless or stateful autoconfiguration. At step 52, a conventional binding update is utilized to register the temporary IP address of the traveling node with the home agent. At step 53, the home agent broadcasts an MIPv6 proxy Neighbor Advertisement on behalf of the traveling node. At step 54, the MARP controller of the home agent recognizes the proxy Neighbor Advertisement. At step 55, in response to the recognition of the proxy Neighbor Advertisement, the MARP controller inspects the proxy Neighbor Advertisement to determine therefrom the (permanent) IP address of the traveling node, and then adds this IP address to its MARP proxy list. Thereafter at step 56, the MARP controller performs a MANET-level broadcast of the proxy Neighbor Advertisement, for example, by encapsulating in a special MARP header the IP packet that carries the proxy Neighbor Advertisement. (If the IP address that the MARP controller determines from the proxy Neighbor Advertisement does not correspond to a participant in the MANET, then the MARP controller can ignore the proxy Neighbor Advertisement altogether.)

The proxy Neighbor Advertisement produced at step 53 by the MIPv6 controller of the home agent operates to advertise that the home agent's link layer address is the traveling MANET node's home address. When the MARP controller in the home agent performs the MANET-level broadcast of the proxy Neighbor Advertisement at step 56, each of the remaining MANET nodes in the home network is provided with the updated home address for the traveling MANET node. This is illustrated generally in FIG. 6

Figure 6:
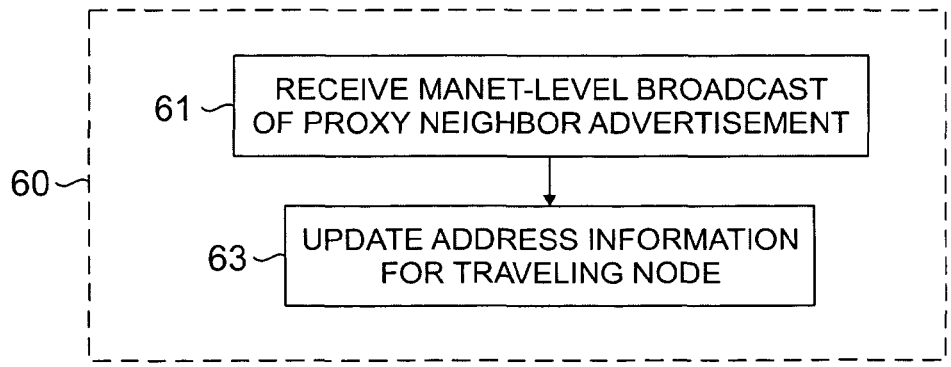
FIG. 6 is a flow diagram illustrating exemplary operations which can be performed by the home network MANET nodes of FIG. 4 according to the principles of the present invention.

FIG. 6 illustrates flow diagram 60, which illustrates exemplary operations which can be performed by the home network MANET nodes of FIG. 4 according to the principles of the present invention. In FIG. 6, each of the remaining MANET nodes (see also FIGS. 1 and 4) receives at step 61 the MANET-level broadcast of the proxy Neighbor Advertisement. At step 63, each of these MANET nodes updates its address information for the traveling node in accordance with the address information in the proxy Neighbor Advertisement. As a result of the address updating at step 63, any packets originating from any of the remaining MANET nodes and intended for delivery to the traveling MANET node will be directed to the home agent's link layer address.

Figure 7:
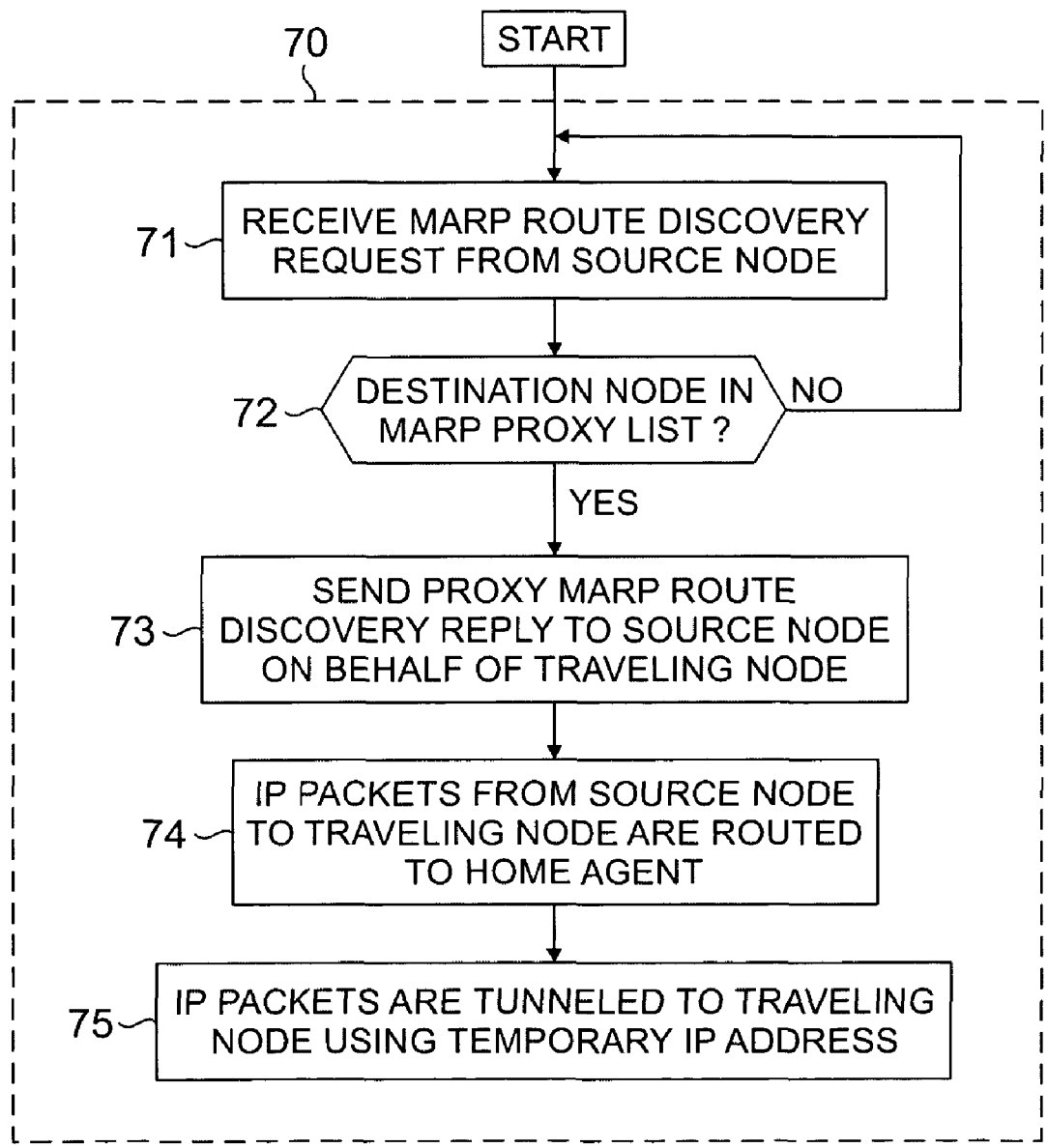
FIG. 7 is a flow diagram illustrating exemplary operations of the present invention wherein the home network MANET nodes of FIG. 4 transmit information to the traveling MANET node of FIG. 4.

FIG. 7 depicts flow diagram 70, which illustrates exemplary operations according to the invention for setting up and executing communications from any of the remaining MANET nodes to the traveling MANET node. At step 71, the MARP controller of the home agent receives a MARP route discovery request (RREQ) from the MARP controller of a source MANET node. At step 72, the MARP controller in the home agent determines whether the destination node IP address referenced in the RREQ is in its MARP proxy list. If not, then the home agent awaits the next MARP route discovery request at step 71. If the destination node is in the home agent MARP controller's proxy list at step 72, then the home agent MARP controller sends a proxy MARP route discovery reply (RREP) to the MARP controller of the source MANET node on behalf of the traveling MANET node, as shown at step 73. Thereafter, at step 74, IP packets from the source MANET node to the traveling MANET node are routed to the home agent. At step 75, the home agent MARP controller forwards the received IP packets to the home agent MIPv6 controller, which in turn tunnels the forwarded IP packets to the traveling MANET node using the traveling MANET node's temporary IP address.

Referring again to FIG. 2, the operations at steps 74 and 75 can be accomplished, for example, by the MARP controller 27 forwarding to the mobile IPv6 controller 24 the IP packets that it receives from the source MANET node. By virtue of the binding update that the traveling node has previously executed (see also FIGS. 4 and 5), the mobile IPv6 controller 24 can use conventional techniques to tunnel the received IP packets to the traveling node, using the traveling node's temporary IP address.

Figure 8:
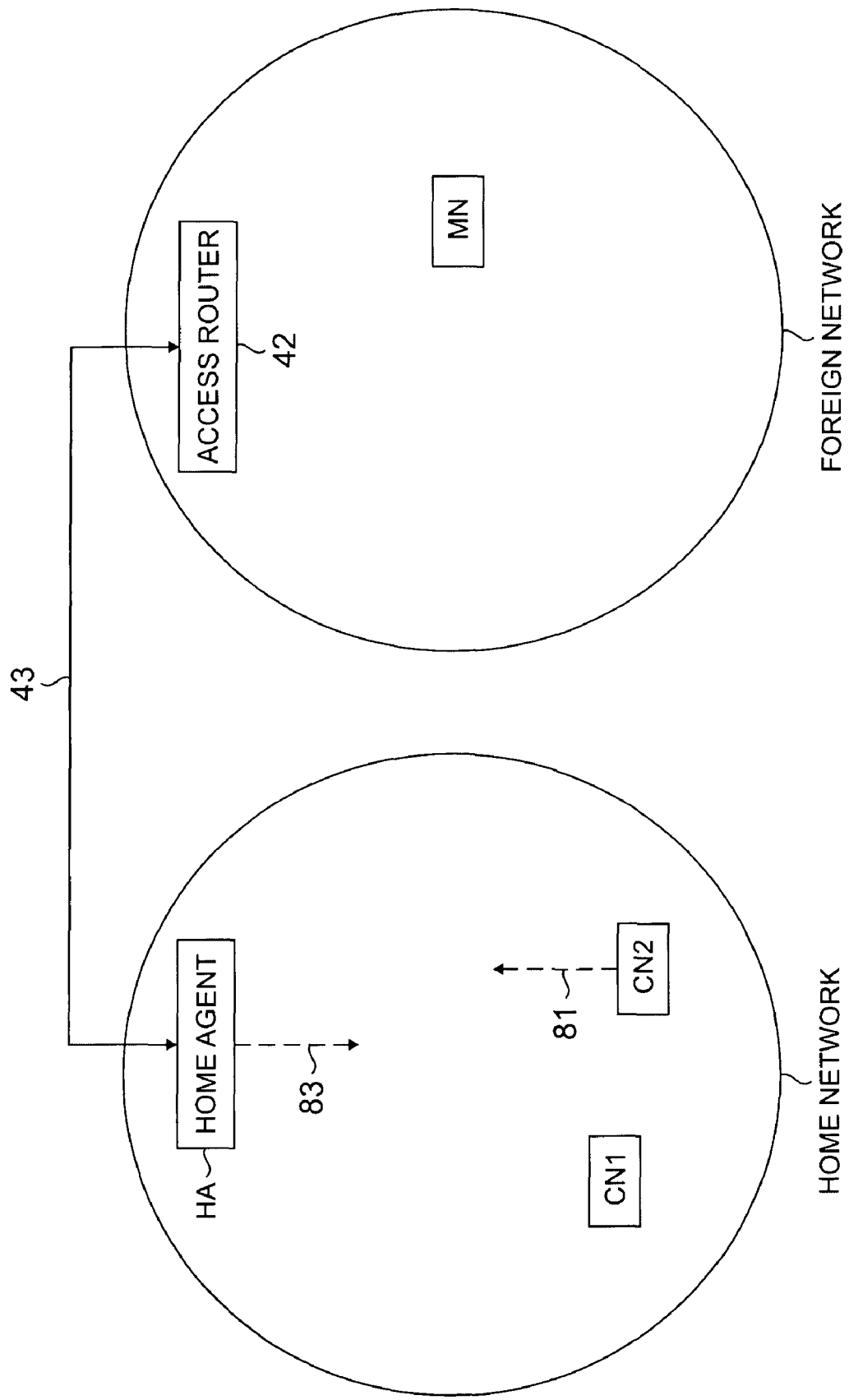
FIG. 8 illustrates the MANET protocol communications of FIG. 7.

FIG. 8 is generally similar to FIGS. 1 and 4. FIG. 8 illustrates the MARP route discovery request and the MARP route discovery reply described above with respect to FIG. 7. In the example of FIG. 8, a MANET node CN2 remaining in the home network sends a conventional MARP route discovery request RREQ for the traveling MANET node MN, as illustrated generally by dotted line 81. The home agent HA responds to the route discovery request RREQ by sending a proxy MARP route discovery reply RREP on behalf of the traveling MANET node MN, as illustrated generally by dotted line 83.

Figure 9:
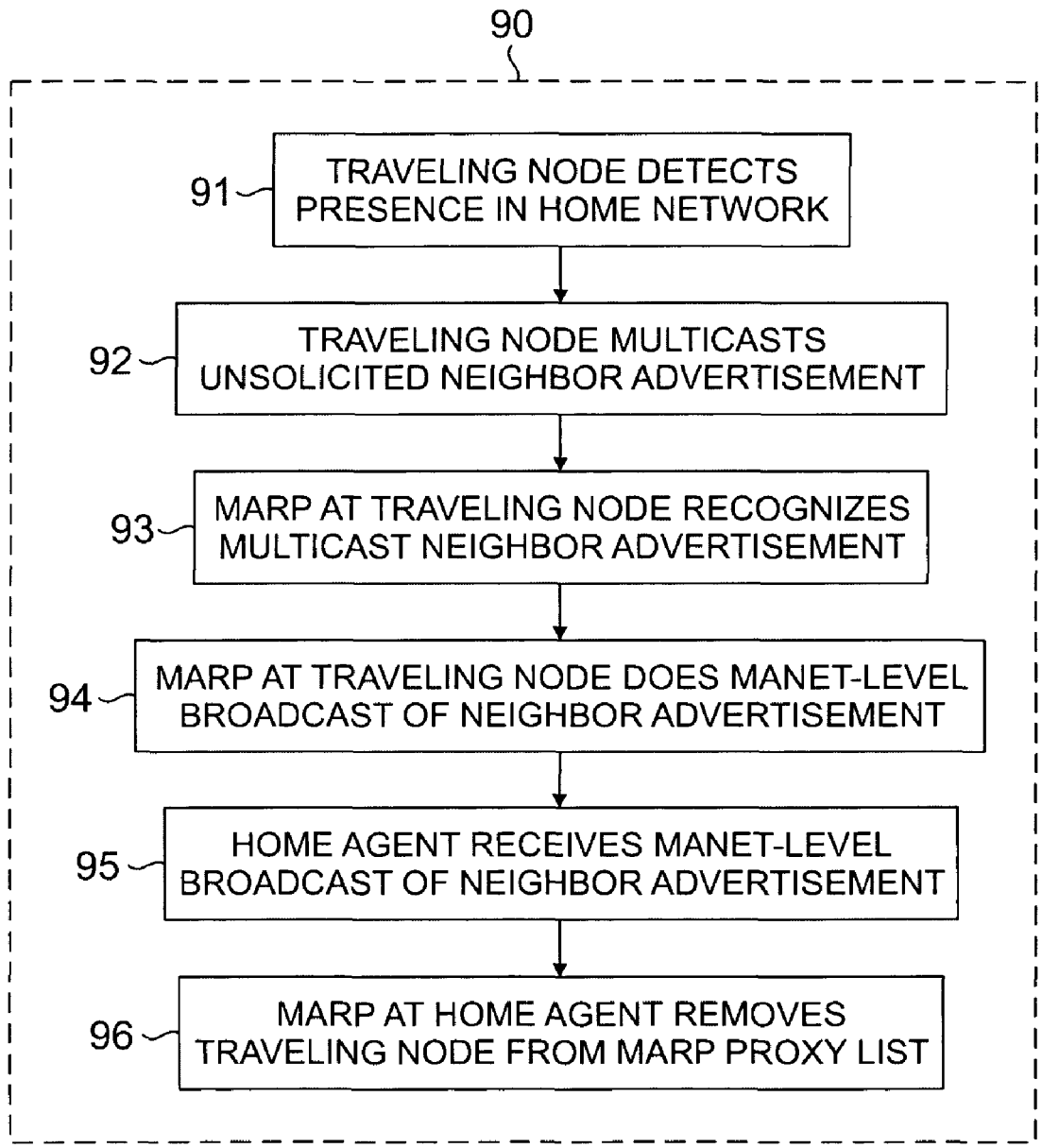
FIG. 9 is a flow diagram illustrating exemplary operations of the present invention wherein a traveling MANET node is transitioned from extended mobility operation back into normal MANET operation.

FIG. 9 depicts flow diagram 90, which illustrates exemplary operations which can be performed according to the invention when a traveling MANET node travels back to a location within range of the remaining MANET nodes to resume conventional participation within the MANET. At step 91, the traveling node uses conventional MIPv6 functionality to detect that it has returned to its home network, for example, via router advertisements. At step 92, the MIPv6 controller of the traveling node uses conventional MIPv6 functionality to multicast an unsolicited Neighbor Advertisement. At step 93, the MARP controller of the traveling node recognizes the multicast Neighbor Advertisement produced by the MIPv6 controller of the traveling node. At step 94, the MARP controller of the traveling node performs a MANET-level broadcast of the multicast Neighbor Advertisement, for example, by encapsulating in a special MARP header the IP packet which carries the Neighbor Advertisement.

At step 95, the MARP controller at the home agent receives the MANET-level broadcast of the Neighbor Advertisement. At step 96, the MARP controller at the home agent inspects the Neighbor Advertisement to determine therefrom the IP address of the (formerly) traveling node, and removes that IP address from its MARP proxy list. Thus, the home agent is disengaged as a proxy for the formerly traveling MANET node which has now returned to the MANET for conventional operation therein.

Referring again to FIG. 6, the operations illustrated therein at steps 61 and 63 can be performed by each of the MANET nodes in response to the MANET-level broadcast illustrated at step 94 in FIG. 9. Thus, each of the MANET nodes can perform the address update at step 63 and thereby restore the proper address for the formerly traveling MANET node which has now returned to the MANET.

As demonstrated in the foregoing description, the present invention exploits the operation of the conventional MIPv6 protocol to provide extended mobility in a MANET, without requiring any modification of the MIPv6 protocol.

Although the present invention has been described with an exemplary embodiment, various changes and modifications may be suggested to one skilled in the art. It is intended that the present invention encompass such changes and modifications as fall within the scope of the appended claims.

What is claimed is:

1. An apparatus for extending mobility in a mobile ad-hoc network (MANET) comprising a plurality of MANET nodes, the apparatus comprising:

an IPv6 controller configured to receive an IPv6 binding update from a traveling MANET node and, in response to receiving the IPv6 binding update, produce an IPv6 proxy Neighbor Advertisement, the IPv6 proxy Neighbor Advertisement comprising a link layer address of the apparatus, wherein the link layer address serves as the home address for the traveling MANET node; and a MANET controller coupled to said IPv6 controller and configured to recognize when said IPv6 controller produces the IPv6 proxy Neighbor Advertisement on behalf of the traveling MANET node, the traveling MANET node outside wireless communication range of the other MANET nodes, wherein said MANET controller is further configured to perform proxy communication with the mobile ad-hoc network on behalf of the traveling MANET node in response to said recognition.

2. The apparatus as set forth in claim 1, wherein said MANET controller is further configured to transmit on the mobile ad-hoc network information from the IPv6 proxy Neighbor Advertisement in response to said recognition.

3. The apparatus as set forth in claim 2, wherein said apparatus is configured to operate as a gateway apparatus and further comprises a first interface to a wired network and a second interface to a wireless network.

4. The apparatus as set forth in claim 3, wherein said first interface is coupled to said IPv6 controller and said second interface is coupled to said MANET controller.

5. The apparatus as set forth in claim 4, wherein said information further comprises destination address information which the mobile ad-hoc network is to use for proxy communication with the traveling MANET node.

6. The apparatus as set forth in claim 5, wherein said MANET controller is further configured to encapsulate the IPv6 proxy Neighbor Advertisement in a MANET-level packet in response to said recognition.

7. An apparatus for extending mobility in a mobile ad-hoc network (MANET) comprising a plurality of MANET nodes, the apparatus comprising:

a MANET controller configured to broadcast information from an IPv6 Neighbor Advertisement from a mobile MANET node over the mobile ad-hoc network, the mobile MANET node outside wireless communication range of the other MANET nodes, the IPv6 Neighbor Advertisement produced in response to an IPv6 binding update from the mobile MANET node, the IPv6 Neighbor Advertisement comprising a link layer address of the apparatus, wherein the link layer address serves as the home address for the traveling MANET node, wherein said MANET controller, in response to said IPv6 Neighbor Advertisement, is further configured to perform proxy communication with the mobile ad-hoc network on behalf of the mobile MANET node.

8. The apparatus as set forth in claim 7, further comprising an IPv6 controller provided in said mobile MANET node and configured to produce said IPv6 Neighbor Advertisement, wherein said MANET controller provided in said mobile MANET node together with said IPv6 controller.

9. The apparatus as set forth in claim 7, wherein said MANET controller is further configured to encapsulate the IPv6 Neighbor Advertisement in a MANET-level packet.

10. The apparatus as set forth in claim 7, wherein said MANET controller is further configured to receive from a source MANET node a routing discovery request for a destination MANET node and said MANET controller is further configured to respond to the routing discovery request by sending a proxy MANET routing discovery reply to the source MANET node on behalf of the destination MANET node.

11. The apparatus as set forth in claim 10, wherein said MANET controller is responsive to the routing discovery request for determining whether the destination MANET node has been previously determined to require proxy communication with the mobile ad-hoc network.

12. The apparatus as set forth in claim 10, wherein said MANET controller is configured, after sending the proxy MANET routing discovery reply, to perform further proxy communication with the source MANET node on behalf of the destination MANET node.

13. The apparatus as set forth in claim 10, wherein said apparatus is implemented as a gateway apparatus.

14. A method of extending mobility in a mobile ad-hoc network (MANET) comprising a plurality of MANET nodes, the method comprising the steps of:

receiving an IPv6 binding update from a traveling MANET node;

in response to receiving the IPv6 binding update, producing an IPv6 proxy Neighbor Advertisement, the IPv6 proxy Neighbor Advertisement comprising a link layer address of a home agent, wherein the link layer address serves as the home address for the traveling MANET node;

recognizing the IPv6 proxy Neighbor Advertisement produced on behalf of the traveling MANET node, the traveling MANET node outside wireless communication range of the other MANET nodes; and in response to the step of recognizing, executing one of (a) performing proxy communication with the mobile ad-hoc network on behalf of the traveling MANET node, and (b) transmitting on the mobile ad-hoc network information from the IPv6 proxy Neighbor Advertisement.

15. The method as set forth in claim 14, further comprising the step of adding the traveling MANET node to a proxy list in response to the step of recognizing.

16. The method as set forth in claim 14, wherein the step of transmitting includes the step of encapsulating the IPv6 proxy Neighbor Advertisement in a MANET-level packet.

17. The method as set forth in claim 14, wherein the information includes destination address information which the MANET is to use for proxy communication with the traveling MANET node.

18. The method as set forth in claim 14, further comprising the steps of:

receiving from a source MANET node a routing discovery request for a destination MANET node; and in response to receipt of the routing discovery request, sending a proxy MANET routing discovery reply to the source MANET node on behalf of the destination MANET node.

19. The method as set forth in claim 18, further comprising the step, in response to the routing discovery request, of determining that the destination MANET mode has been previously determined to require proxy communication with the mobile ad-hoc network.

20. The method as set forth in claim 18, further comprising the step, after the step of sending, of performing further proxy communication with the source MANET node on behalf of the destination MANET mode.

* * * * *